United States Patent [19]

Ozawa et al.

[11] Patent Number: 5,007,677
[45] Date of Patent: Apr. 16, 1991

[54] VEHICULAR SEAT LUMBAR SUPPORT DEVICE

[75] Inventors: Makoto Ozawa, Odaware; Yasuo Hirama, Chigasaki; Shyuzi Mizuno, Kanagawa, all of Japan

[73] Assignees: Ikeda Bussan Co., Ltd., Ayase; Nissan Shatai Company, Limited, Hiratsuka, both of Japan

[21] Appl. No.: 441,043

[22] Filed: Nov. 24, 1989

[30] Foreign Application Priority Data

Nov. 29, 1988 [JP] Japan ................. 63-301294

[51] Int. Cl.⁵ ................................ A47C 3/00
[52] U.S. Cl. .................... 297/284; 297/460
[58] Field of Search ........... 297/284, 460, 456, 440

[56] References Cited

U.S. PATENT DOCUMENTS

| | | | |
|---|---|---|---|
| 3,241,879 | 3/1966 | Castello et al. | 297/284 |
| 4,148,522 | 4/1979 | Sakurada et al. | 297/284 |
| 4,588,172 | 5/1986 | Fourrey et al. | 297/284 |
| 4,682,763 | 7/1987 | Kazaoka et al. | 297/284 X |
| 4,692,848 | 10/1987 | Hattori et al. | 297/284 X |
| 4,715,653 | 12/1987 | Hattori et al. | 297/284 |
| 4,725,095 | 2/1988 | Benson et al. | 297/284 |
| 4,830,429 | 5/1989 | Petitjean | 297/284 |
| 4,886,316 | 12/1989 | Suzuyama et al. | 297/284 |

FOREIGN PATENT DOCUMENTS 60-137850 9/1985 Japan.

*Primary Examiner*—Jose V. Chen
*Attorney, Agent, or Firm*—Foley & Lardner

[57] ABSTRACT

A vehicular seat is formed with an adjustable spring structure at an internal portion thereof. The structure is selectively adjustable for determining the degree of support the seat occupant receives at his or her lower back and features an arrangement which is supported on the end of a pair of adjustable crank arms so as to be operable between a normal position in which the support to the lower back of the seat occupant is mildly enhanced, and an extra support position in which the seat back contour is altered and the support of the seat occupant's lower back is greatly enhanced in a manner which reduces fatigue of the seat occupant over long periods.

8 Claims, 4 Drawing Sheets

VEHICULAR SEAT LUMBAR SUPPORT DEVICE

BACKGROUND OF THE INVENTION

1. Field of the Invention

The present invention relates to a seat back arrangement for a vehicular seat. More specifically the present invention relates to a seat back arrangement for a vehicular seat in which a support structure for supporting the lower back or lumbar section of the seat occupant is adjustable so as to improve the comfort of the occupant and to decrease fatigue during long drives.

2. Description of the Prior art

One example of a conventional prior art lumbar support device is shown in Japanese Utility Model First Provisional Publication No. 60-137850.

In this device, in order to provide additional support for the lumbar section of a vehicular seat occupant, an inflatable pneumatic cushion is provided so as to be mounted at an inside front position of the vehicular seat. The pneumatic cushion is disposed at the portion of a seat back which supports the lower back or lumbar portion of the seat occupant. By adjusting the pressure of the air in the pneumatic cushion, it is possible to adjust the firmness and, in effect, the contour of the portion of the vehicular seat which provides the support to the lower back of the vehicular seat occupant.

The above described pneumatic seat cushion has various disadvantages, however. One disadvantage is that it is difficult to adjust the air pressure in the pneumatic cushion to a pressure which is comfortable for the seat occupant while still providing enough support for the lower back portion of the vehicular seat occupant to prevent fatigue.

Another disadvantage of the above pneumatic cushion is that it is an unsightly and troublesome addition to the front of the seat.

Still another disadvantage of the above pneumatic seat cushion is that, since it is not integral with the seat back, when it is inflated so as to provide a degree of lower back support which decrease fatigue of the seat occupant it tends to cause the seat occupant the uncomfortable sensation that there is a foreign body interposed between the front of the seat and the occupant's back.

SUMMARY OF THE INVENTION

It is a primary objective of the instant invention to provide a mechanism by which the lower back of a vehicular seat occupant can be supported, and by which the degree of lower back support can be easily adjusted by the seat occupant.

It is another objective of the instant invention to provide a lumbar support mechanism by which the lower back of a vehicular seat occupant can be supported and which is integral with the seat back of the vehicle.

It is still another objective of the instant invention to provide a lumbar support mechanism which is incorporated into the structure of the seat back so as to provide a smoothly distributed degree of support across the seat occupant's back so that the seat occupant is not subject to the uncomfortable sensation that a foreign body is disposed between the occupant's back and the seat back.

In brief, the above objects are achieved by an arrangement wherein a vehicular seat is formed with an adjustable spring structure at an internal portion thereof. The spring structure is selectively adjustable for determining the degree of support the seat occupant receives at his or her lower back, and features an arrangement which is supported on the end of a pair of adjustable crank arms so as to be operable between a normal position in which support of the lower back of the seat occupant is mildly enhanced, and an extra support position in which the seat back contour is altered and the support of the seat occupant's lower back is greatly enhanced in a manner which reduces fatigue of the occupant when seated for prolonged periods.

More specifically, a first aspect of the present invention is deemed to comprise a lumbar support device which features: a seat back frame; a plurality of vertical main springs mounted on the seat back frame for resiliently supporting a seat back surface, the seat back frame constituting the structural base of the seat back; a pair of support brackets being connected to a supporting member through a pivot portion; a lateral spring extending at a portion of the seat back surface whereby a lumbar portion of a seat occupant is supported, the lateral spring is equipped with fixing portions which are fixed to the main springs, the lateral spring has both end portions bent rearward and the bent portions are supported by the support brackets; a supporting member connected to the seat back frame in a manner to allow the pivot portion to move from a normal position to a lumbar support position which is located forward of the normal position; and moving means arranged between the seat back frame and the supporting member for moving the pivot portion between the normal position and the lumbar support position.

A second aspect of the present invention is deemed to comprise a vehicular seat back which features: a frame which defines upper and lower cross members; a spring which extends between the upper and lower cross members for resiliently supporting the back of a vehicular seat occupant; a lower back support portion defined on the vertical spring; a lumbar support spring having a first end engaging the lower back support portion so as to apply resilient force thereto in the direction of the back of the vehicular seat occupant; a lumbar support spring support mechanism engaging a second end of the lumbar support spring, and being adjustable between a first position in which the lumbar support spring applies a first degree of pressure to the lower back support portion and a second position in which the lumbar support spring applies a second degree of pressure to the lower back support portion.

DETAILED DESCRIPTION OF EMBODIMENT

FIGS. 1 through 7 show an embodiment of the present invention

Figure 1:
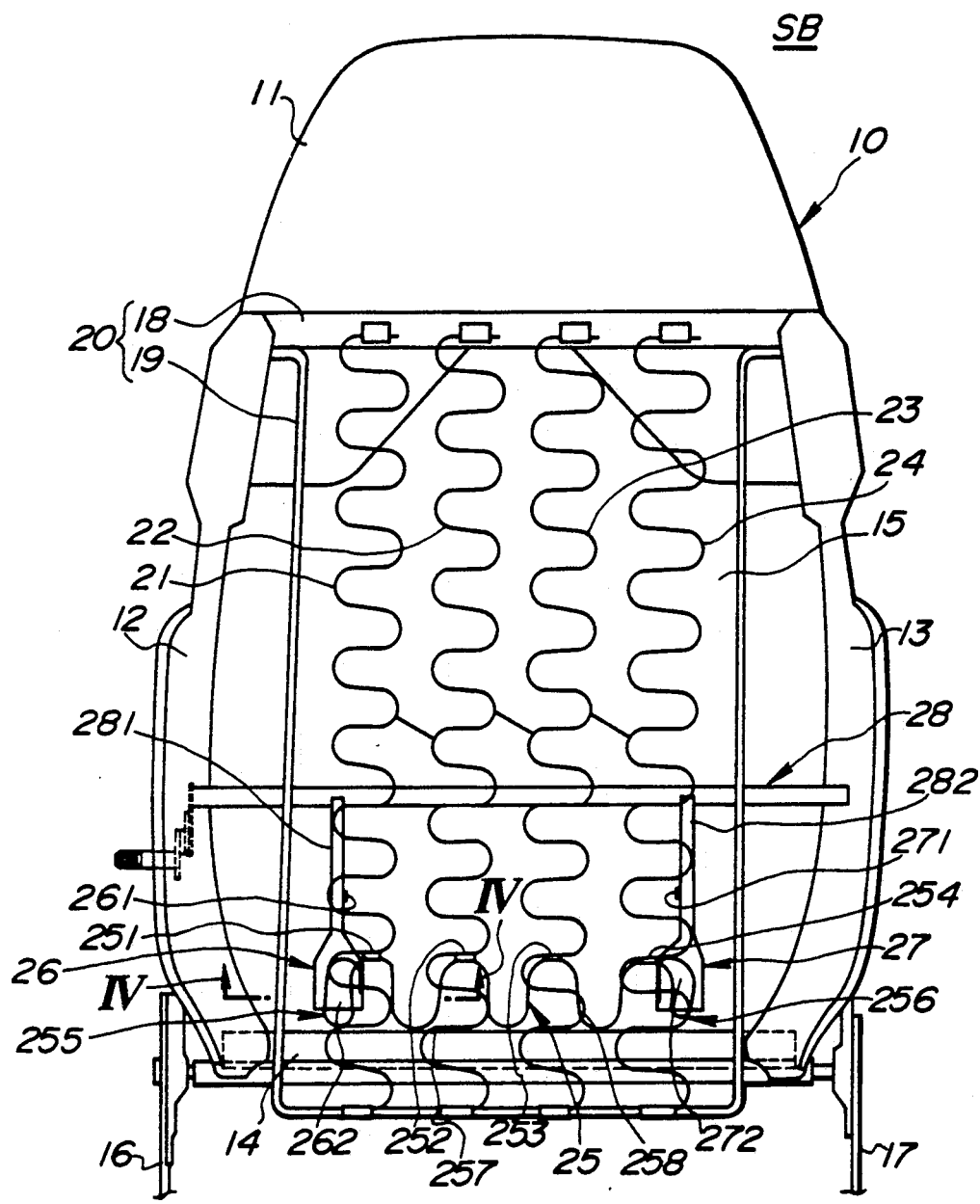
FIG. 1 is a front elevation view of the internal structure of a seat back which is equipped with a lumbar support device according to an embodiment of the present invention.
Figure 2:
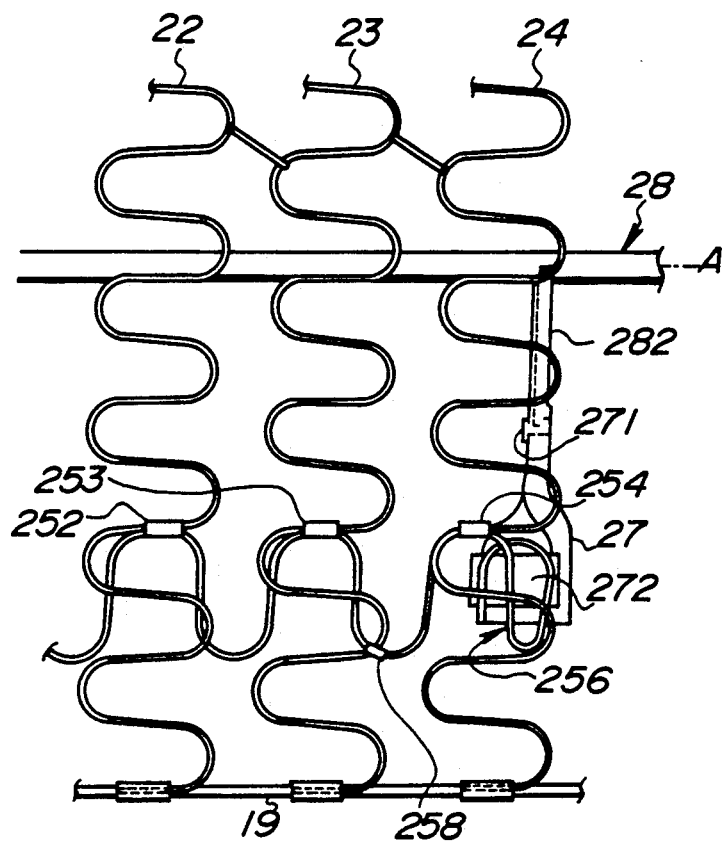
FIG. 2 is an enlarged front elevation view showing part of the lumbar support device of the embodiment and the main springs of a seat back in which the lumbar support device is provided.

In FIG. 1 a seat back frame generally denoted by the numeral 10, of a seat back SB, is shown. The seat back frame 10 is generally rectangular in configuration and comprises a top panel 11, left and right side panels 12 and 13 and a lower lateral connecting member 14. These frame elements are arranged in such a manner as to enclose a space 15. The lower lateral connecting member 14 is supported at both ends thereof on the frame of a lower seat cushion (not shown) by means of the left and right supporting brackets 16 and 17.

The seat back frame 10 also comprises a spring supporting frame 20 which consists of an upper cross bar 18 which extends between the upper end portions of the side panels 12 and 13, and a generally U-shaped wire frame member 19. The upper end portions of the U-shaped wire frame member 19 are fixed to the upper cross bar 18 and the lower portion thereof is fixed to the lower connector member 14.

In order to provide resilient support to the front seat back surface S (indicated in chain lines in FIG. 6) of the seat back SB the cushion support spring frame 20 comprises four main S-springs 21, 22, 23 and 24 which extend vertically and are supported at their upper ends by the upper lateral cross bar and at their lower ends by the lower middle section of the U-shaped wire frame member 19. The main springs 21, 22, 23, and 24 are constructed of resilient wire define patterns which are essentially similar to vertically extending parallel sine waves.

In accordance with the invention, a lateral spring 25 is arranged in connection with the lower portions of the main springs 21 to 24, in the vicinity of the lower portion of the seat back surface S by which the lumbar portion of the seat occupant is supported.

Similarly to the vertical springs 21 through 24, the lateral S-spring 25 is formed so as to define a shape similar to a horizontally extending sine wave, when viewed from the rear. The sine wave like shape of the lateral S-spring defines crest portions 251, 252, 253, and 254, middle trough portions 257, 258 and end potions 255 and 256. Each of the four crest portions 251 through 254 of the lateral S-spring 25 is fi>:ed to a portion of one of the four main springs 21 to 24. It will further be noted that in order to prevent rotation of the lateral spring 25 relative to the main springs 21 through 24, preferably at least the trough portions 258 and 257 are connected to the main springs.

Figure 4:
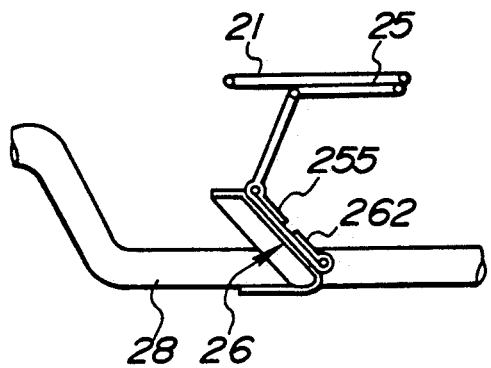
FIG. 4 is a sectional view taken along the line IV—IV of FIG. 1, showing a spring end holding clip of the device according to the invention.
Figure 5:
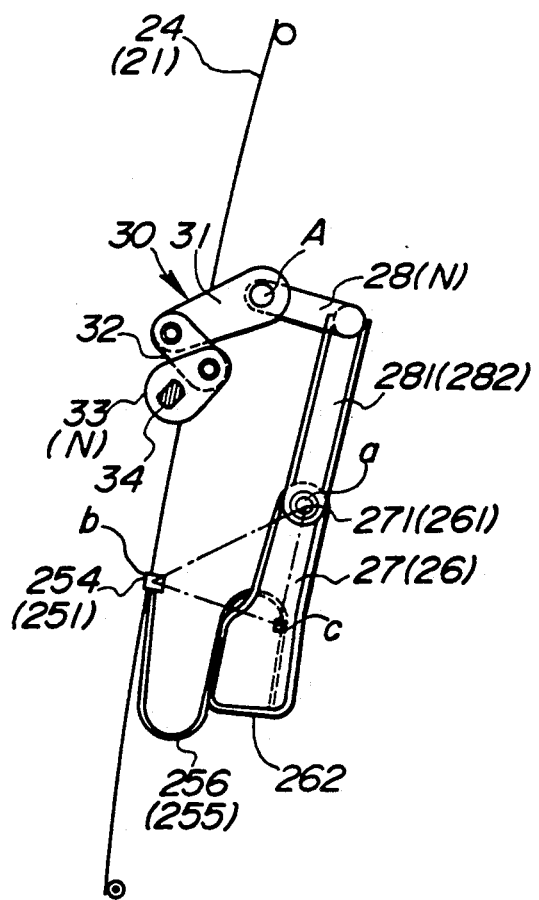
FIG. 5 is an enlarged side elevation view depicting the actuator members of the lumbar support device according to the preferred embodiment of the invention while the device is being used in a normal mode.
Figure 6:
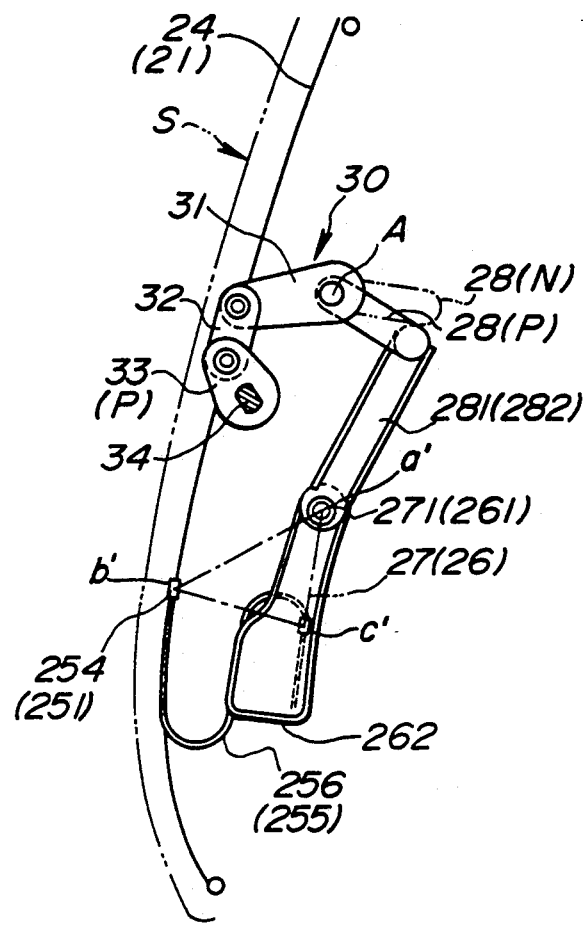
FIG. 6 is an enlarged side elevation view depicting the actuator members of the lumbar support device according to the preferred embodiment of the invention, while the device is used in an "active" lumbar support mode.

As is shown in FIGS. 4, 5 and 6, the right and left end portions of the lateral spring 25, are bent rearward. The rearmost portions of these bent end sections of the spring 25 are bent toward the center of the seat back frame 10, as can be seen from FIG. 2. Thus, the end portions 255 and 256 of the lateral spring 25 are formed so as to project to the rear of the cushion support spring frame 20. The end portions 255 and 256 of the lateral spring 25 which project to the rear are supported and attached to the frame 20 by means of the support brackets 26 and 27.

Figure 7:
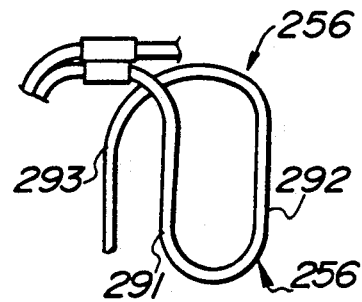
FIG. 7 is an enlarged partial view of a lumbar support device according to the instant invention in which an end portion of a lateral spring member, and its connection to a main spring, are shown.

FIG. 7 is an enlarged front view showing the end portion 256. As will be appreciated from this figure, the end portion 256 comprises a length of the spring wire from which the lateral spring 25 is formed that is equal to at least 1.5 cycles of the sine wave described by the lateral spring 25. For the purposes of this disclosure the individual contours of the spring end portion 256 of the lateral spring 25 are specifically denoted by the numerals 291, 292 and 293. It will be understood that the structure of the end portion 255 is essentially a mirror version of that of the end portion 256 and therefore the descriptions of the contours 291, 292, and 293 will be understood to apply to the corresponding portions of the end 255 of the lateral spring.

The engaging portion 293 of the spring end portion 256 of the lateral spring 25 engages a spring end clip portion 272 of the support bracket 27. The spring end support clips 262 and 272 are formed at lower end portions of both the support brackets 26 and 27. As can be seen best from FIG. 4, the spring end clips 262 and 272 are formed such that the plane defined thereby lies at an angle relative to the seat back front cushion surface S.

The spring end support clips 262 and 272 receive the engaging end portions 293 and the engaging portion 292 of the spring end portions 256 and 255 of the lateral spring 25, in such a manner as to affect a rigid coupling between the rearward projecting end portion of the lateral spring 25 and a pair of support brackets 26 and 27.

The support brackets 26 and 27 are pivotally supported, via journal pins 261 and 271 on the lower ends of respective bracket members 281 and 282. The support brackets 26 and 27 are supported so as to be pivotable fore and aft, about the journal pins 261 and 271.

The bracket link arms 281 and 282 are coupled to a rotatable crank member 28, whose central portion describes a shallow U. The rotatable crank member 28 is supported so as to extend laterally between the side panels 12 and 13. The end portions of the crank member 28 as will be described in further detail later are supported on the side panels so as to be selectively rotatable relative thereto.

The bracket link arms 281 and 282 are rigidly affixed to the central portion of the rotatable crank member 28 so as to project downwards therefrom at an angle that is substantially normal to the plane defined by the U-shaped central section of the rotatable crank member 28.

The rotatable crank member 28 is supported by the side panels 12 and 13 in such a manner as to be pivotable about the axis A as shown in FIGS. 5 and 6. At one end the crank member terminates in a boss (not shown) in the side panel 13 so as to be pivotable relative thereto about the axis A. At its other end the rotatable crank member 28 is supported on the side panel 12 so as to be pivotable with respect thereto about the axis A and is associated with a pivot link mechanism 30.

The pivot link mechanism 30 is provided for actuating the rotatable crank member 28 to pivot about its axis.

Figure 3:
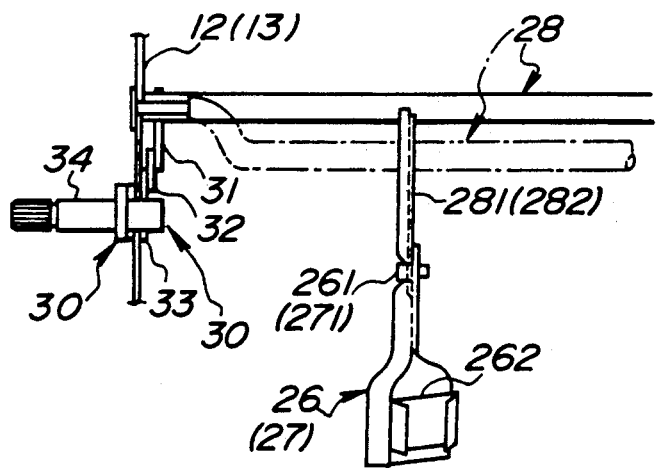
FIG. 3 is an enlarged front elevation view showing some of the essential actuation members of the lumbar support device of the invention.

As is shown in FIGS. 3, 5, and 6, the link mechanism 30 is generally comprised of the rigid link arm 31, the intermediate link 32 and the drive link 33.

The rigid link arm 31 is rigidly affixed to one end of the rotatable crank member 28 and projects forwardly therefrom. The other end of the rigid crank arm 31 is pivotably connected to one end of the intermediate link 32. The other end of the intermediate link is pivotably connected to the outer end of the driving link 33.

The drive link 33 is rigidly attached to a drive shaft 34 so as to rotate therewith about the axis of the drive shaft 34. The drive shaft 34 is pivotally supported on the side panel 12 so as to be rotatable relative thereto. By the rotation of the drive shaft 34, the drive link 33 is pivotable between the normal position N as shown in FIG. 5 and the lumbar supporting position P as shown in FIG. 6.

As will be better appreciated from the following disclosure, by the rotation of the drive link 33 between the positions N and P as shown in FIGS. 5 and 6 the rotatable crank member 28 is driven between the normal position N and the lumbar support position P.

Hereinafter the operation of the lumbar support mechanism formed in accordance with the preferred embodiment of the invention will be described.

As will be appreciated by consideration of the enlarged side elevation views of the lumbar support mechanism given in FIGS. 5 and 6, any pressure in the rearward direction exerted on the front cushion face S of the vehicular seat back SB, between the ends of the springs 21-24 will be exerted on the lateral spring 25 and through the end sections 255 and 256 a portion of this force will be exerted on the spring end brackets 27 and 26 through the spring end support clips 262 and 272. The force exerted on the spring end support brackets is then imposed therethrough onto the lower ends of the brackets 26 and 27 link arms 281 and 282. This force urges the bracket link arms 281 and 282 to rotate the rotatable crank member 28 in the counter clockwise direction of FIGS. 5 and 6 about the axis A. The range of counter clockwise rotation of the rotatable crank member is however inhibited by the drive link mechanism 30.

Therefore the component rearward force imposed on the position of lateral spring 25 that is not resiliently absorbed by the main springs 21 through 24 is absorbed to a large extent by the rearward projecting end portions 255 and 256.

The key positions at which the rearward forces act on and are supported by the lumbar support mechanism can be better understood from a consideration of the imaginary triangle indicated in chain lines in FIGS. 5 and 6.

It will be noted that the hinge formed by the journal pins 271 and 261 defining the bracket pivot point (a) does not comprise any stops to prevent forces acting on the ends of the brackets 27 and 26 from rotating in the rearward direction. It will further be noted that the end portion of the lateral spring 25 is maintained in the clips in such a manner that the spring ends 255 and 256 cannot slide or rotate relative to the spring end clips 262 and 272 beyond the end point c which defines the working end point of the spring.

The lateral spring 25 is rigidly coupled to the vertical main springs 21 through 24 at the point b so that it cannot move vertically relative to the main springs 21 through 24.

Thus bearing the above in mind, it will be seen that the reaction forces acting on the point b at which the end sections 255 and 256 of the lateral spring 25 are coupled to the main springs 21 through 24 may be considered to be a composite of the forces acting at points a, b, and c.

It will first be noted that force in the rearward direction acting on the lower spring brackets 26 and 27 at the point c tends to urge the lower spring brackets 27 and 28 to rotate in the counter clockwise direction about the journal pin 271 at the pivot point a. It will further be noted that since the spring end sections 256 and 255 are rigidly connected to the spring end clips 262 and 272 at the ends of the brackets 27 and 26 and to the main springs 21 and 24 at the point b, rotation of the lower brackets 26 and 27 about the pivot point a exerts a strong downward force at the point b where the lateral spring 25 is connected to the main springs.

Since this downward force is supported at the point b by the main springs, this serves to restrict the rotation in the rearward direction of the lower bracket members 26 and 27 to a degree that is determined by the resilience of the spring end sections 256 and 255.

Thus it will be appreciated that force in the rearward direction acting at point b whereat the lateral spring 25 is connected to the vertical main springs is effectively applied through the resilient end portions 256 and 255 of the spring 25 and through the lower brackets 26 and 27, whose rotation is restricted by the resilience of the spring end portions 255 and 256, to the pivot point a defined by the pivot connections 271 and 261 between the lower brackets 26 and 27 and the link arm members 281 and 282.

The resilience of the spring end portions 256 and 255 is added to the resilience of the vertical main springs 21 through 24 at the point b such that the resilient support of the back of the occupant of the seat is augmented at the portion of the seat back which supports the seat occupant's lower back. This in effect makes the seat back firmer at the lumbar portion of the seat occupants back than at the upper portions of the seat occupants back.

Thus, while the lumbar support mechanism is in the normal mode, a seat back is provided which is soft enough to be very comfortable to the occupant at the upper portion thereof while still offering enhanced support at the lower back portion so as to prevent fatigue to the seat occupant during long drives.

What is more since these advantages are achieved by adjusting the actual inherent firmness of the respective portions of the seat back, rather than augmenting the contours of the seat back to compensate for a heavier load to the seat back that is invariably exerted at the lumbar portion, the seat occupants weight has little effect on the degree of effectiveness of the lower back support and the seat back contour remains consistent. Therefore, the same seat is equally comfortable for a relatively light seat occupant as for a heavy occupant.

Directing attention now to the driving mechanism 30, as has been noted above with respect to FIGS. 5 and 6, any pressure applied by the back of the seat occupant to the seat back surface S in the vicinity of the point b is applied to the point a at the lower end of the link arms 281 and 282 and this pressure on the lower ends of the link arms 281 and 282 tends to urge them to rotate in counter clockwise direction of FIGS. 5 and 6. This rotational force transmitted through the rigid link arm 31 to the intermediate floating link 32 by which the link arm 31 is connected to the driving link 33.

Stops (not shown) are provided on the driving shaft 34 of the driving link 33 which restrict the range of rotation of the driving link 33.

When the lumbar support driving link 33 is in the normal position N shown in FIG. 5, it is at one end of its range of rotation. Therefore, the rotating force acting on the crank member 28 is transmitted through the rigid link 31 to the intermediate link 32 and acts as a clockwise rotating force on the driving link 33 to drive it against its stop. Thus the driving link 33 is resiliently maintained in the normal position N as indicated in FIG. 5.

Now reference will be made to FIG. 6 wherein the lumbar support mechanism is depicted as being in the extra support or "active" mode.

In order to place the lumbar support mechanism in the active mode the driving link 33 is actuated to the active position P shown in solid lines in FIG. 6 by means of a handle (not shown) on the drive shaft 34. This places the driving link at the opposite end of its range of rotation from that shown in FIG. 5.

As in the normal position rotating force acting on the crank member 28 from point a is transmitted through the rigid link 31 to the floating link 32 and acts as a rotating force on the driving link 33 to drive it against its stop. In the active mode however, the rotating force acts on the drive link 33 in the counter clockwise direction so that the driving link 33 is resiliently maintained in the active position P as indicated in FIG. 6.

When the drive link 33 is in the position P the crank member is caused to rotate about the pivot A to the active position P. This causes the position of the pivot at which the lower brackets 26 and 27 are connected to the link arms 281 and 282 to be moved forward from the position a to the position a'.

As the support pivot point is pushed forward to the point a' this resiliently forces the connecting points c' and b' forward. Since the relationship between the points a', b' and c' is essentially identical to that of, the points a, b, and c as set forth above the lower brackets 26 and 27 remain essentially parallel to the front of the seat back S while spring pressure acting at point b' is increased thus altering the contour of the seat back so as to provide increased support at the lower back portion thereof.

It will be noted that since the support triangle defined by the points a', b', and c' can pivot under an excessive force exerted on the seat back, there is no sensation for the seat of a foreign body being inside the seat back even when the spring mechanism is actuated into the active mode to provide extra support for the lower back of the seat occupant.

It will further be noted that since the adjusting mechanism acts with a resilient force on the main springs 21 through 24 the contour of the seat back is altered in a manner which provides an even contour which feels natural for the seat occupant and which produces no sensation of a foreign body being disposed between the person's body and the seat back.

What is claimed is:

1. A vehicular seat back lumbar support device comprising:
    a seat back frame, said seat back frame including opposite side panels;
    a plurality of vertical main springs, said plurality of vertical main springs being mounted on said seat back frame for resiliently supporting a seat back surface, said seat back frame constituting a structural base of a seat back;
    a supporting member, said supporting member laterally extending between said opposite side panels of said seat back frame and being pivotally supported thereby;
    a pair of arm members, said arm members being secured to said supporting member
    a pair of support brackets, said support brackets being pivotally connected to said arm members through pivot portions;
    a lateral spring, said lateral spring positioned at a portion of the seat back surface whereby a lumbar portion of a seat occupant is supported, said lateral spring being equipped with fixing portions which are fixed to said vertical main springs, said lateral spring having both resilient end portions bent rearward and said resilient end portions being supported by said support brackets; and
    moving means, said moving means being arranged between said seat back frame and said supporting member for rotating said supporting member;
    wherein, said moving means allows said pivot portion of said support bracket, by rotating said supporting member, to move from a normal position to a lumbar support position which is located forward of said normal position, so that said support brackets resiliently forwardly bias said lateral spring and said plurality of main vertical springs so as to provide a smoothly distributed degree of support across said lumbar portion of said seat occupant.

2. A vehicular seat back as set forth in claim 1 wherein said supporting member is an elongated crank member.

3. A vehicular seat back as set forth in claim 1 wherein said arm member projects downwardly from a central portion of said supporting member.

4. A vehicular seat back as set forth in claim 3, wherein said support bracket is pivotally connected, at a leading upper end thereof, by a journal pin, to a leading lower end of said arm member.

5. A vehicular seat back as set forth in claim 4 wherein each of said support brackets is inclined with respect to an axis of said supporting member.

6. A vehicular seat back as set forth in claim 1 wherein said moving means comprises:
    a link arm, said link arm being rigidly secured, at one end portion thereof, to an end portion of said supporting member;
    an intermediate link, said intermediate link being pivotally connected, at one end portion thereof, to the other end portion of said link arm;
    a drive link, said drive link being pivotally connected, at one end portion thereof, to the other end portion of said intermediate link; and
    a drive shaft, said drive shaft being rigidly attached to the other end portion of said drive link, being pivotally supported on said side panel and being selectively pivotal between two positions so as to allow said pivot portion of said support bracket, by rotating said supporting member, to move from said normal position to said lumbar support position.

7. A vehicular seat back as set forth in claim 6 wherein said lateral spring portion comprises a spring wire configured to contain at least 1.5 cycles of a sine wave.

8. A vehicular seat back comprising:
    a seat back frame;
    a plurality of vertical main springs vertically mounted on said seat back frame;
    a lateral supporting member pivotally supported by said seat back frame;
    moving means for pivotally moving said lateral supporting member;

a lateral spring laterally arranged with respect to said seat back frame, said lateral spring being connected to said vertical main springs to constitute a lumbar support portion and having both resilient end portions bent rearward; and linked structures each having one end connected to said lateral supporting member and the other end connected to one of the rearwardly bent resilient end portions of said lateral spring, whereby, when said lateral supporting member is pivoted in a given direction due to operation of said moving means, said linked structures press said rearwardly bent resilient end portions forward, thereby to resiliently bias said lumbar support portion forwardly.

* * * * *